US006533408B1

(12) United States Patent
Erdtmann et al.

(10) Patent No.: US 6,533,408 B1
(45) Date of Patent: Mar. 18, 2003

(54) INK JET PRINTING METHOD

(75) Inventors: David Erdtmann, Rochester, NY (US); Bruce C. Campbell, Rochester, NY (US); Edgardo Lopez, Hilton, NY (US); Hwei-Ling Yau, Rochester, NY (US); Thomas W. Martin, Rochester, NY (US); Chris G. Han-Adebekun, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/887,183

(22) Filed: Jun. 21, 2001

(51) Int. Cl.[7] .................................................. B41J 2/01
(52) U.S. Cl. ........................ 347/100; 347/96; 106/31.6
(58) Field of Search ................................ 347/100, 101, 347/105, 95, 96, 98; 428/195; 106/31.13, 31.28, 31.6

(56) References Cited

U.S. PATENT DOCUMENTS

| 4,460,637 | A | * | 7/1984 | Miyamoto et al. ........... 347/105 |
| 5,716,436 | A | | 2/1998 | Sorriero et al. |
| 5,877,235 | A | * | 3/1999 | Sakuma et al. ........... 106/31.58 |
| 5,891,950 | A | * | 4/1999 | Collins et al. ............... 524/502 |
| 5,981,625 | A | * | 11/1999 | Zou et al. .................... 523/161 |
| 6,235,813 | B1 | * | 5/2001 | Brandt et al. ................ 523/436 |

FOREIGN PATENT DOCUMENTS

| GB | 2 351 292 A | 12/2000 |
| JP | 2000290553 | 10/2000 |

* cited by examiner

Primary Examiner—John Barlow
Assistant Examiner—Manish S. Shah
(74) Attorney, Agent, or Firm—Harole E. Cole

(57) ABSTRACT

An ink jet printing method having the steps of: A) providing an ink jet printer that is responsive to digital data signals; B) loading the printer with an ink-receiving element having a support having thereon a continuous, coextensive, porous ink-receiving layer having interconnecting voids; C) loading the printer with an ink jet ink composition of water, a humectant, a pigment and particles of a water-dispersible polymer; and D) printing on the ink-receiving layer using the ink jet ink in response to the digital data signals.

14 Claims, No Drawings

INK JET PRINTING METHOD

CROSS REFERENCE TO RELATED APPLICATION

Reference is made to commonly assigned, co-pending U.S. patent application Ser. No. 09/742,967 by Erdtmann et al., filed Dec. 20, 2000 entitled "Ink Jet Printing Method".

FIELD OF THE INVENTION

This invention relates to an ink jet printing method employing an ink composition containing water-dispersible polymers.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging.

In ink jet recording processes, it is necessary that the inks being used meet various performance requirements. Such performance requirements are generally more stringent than those for other liquid ink applications, such as for writing instruments (e.g., a fountain pen, felt pen, etc.). In particular, the following conditions are generally required for inks utilized in ink jet printing processes:

(1) The ink should possess physical properties such as viscosity, surface tension, and electric conductivity matching the discharging conditions of the printing apparatus, such as the driving voltage and driving frequency of a piezoelectric electric oscillator, the form and material of printhead orifices, the diameter of orifices, etc;
(2) The ink should be capable of being stored for a long period of time without causing clogging of printhead orifices during use;
(3) The ink should be quickly fixable onto recording media, such as paper, film, etc., such that the outlines of the resulting ink dots are smooth and there is minimal blotting of the dotted ink;
(4) The printed image should be of high quality, such as having a clear color tone and high density, have high gloss and high color gamut;
(5) The printed image should exhibit excellent waterfastness (water resistance) and lightfastness (light resistance);
(6) The printed (ink) images should have good adhesion to the surface of image receiving elements and should be durable and highly resistant to physical and mechanical scratches or damages;
(7) The ink should not chemically attack, corrode or erode surrounding materials such as the ink storage container, printhead components, orifices, etc;
(8) The ink should not have an unpleasant odor and should not be toxic or inflammable; and
(9) The ink should exhibit low foaming and high pH stability characteristics.

The inks used in various ink jet printers can be classified as either dye-based or pigment-based. A dye is a colorant which is molecularly dispersed or solvated by a carrier medium. The carrier medium can be a liquid or a solid at room temperature. A commonly used carrier medium is water or a mixture of water and organic cosolvents. Each individual dye molecule is surrounded by molecules of the carrier medium. In dye-based inks, no particles are observable under the microscope. Although there have been many recent advances in the art of dye-based ink jet inks, such inks still suffer from deficiencies such as low optical densities on plain paper and poor lightfastness. When water is used as the carrier medium, such inks also generally suffer from poor waterfastness.

Pigment-based inks have been gaining in popularity as a means of addressing these limitations. In pigment-based inks, the colorant exists as discrete particles. These pigment particles are usually treated with addenda known as dispersants or stabilizers which serve to keep the pigment particles from agglomerating and/or settling out.

Pigment-based inks suffer from a different set of deficiencies than dye-based inks. One deficiency is that pigment-based inks interact differently with specially coated papers and films, such as transparent films used for overhead projection and glossy papers and opaque white films used for high quality graphics and pictorial output. In particular, it has been observed that pigment-based inks produce imaged areas that are entirely on the surface of coated papers and films which results in images that have poor dry and wet adhesion properties and can be easily smudged. In recent years, inkjet receivers have been developed to have both high gloss and high porosity to give fast drying capabilities. However, scratch mark smudges are more visible on high gloss receivers. There is a need to provide a pigmented ink composition which can be used in printing images on the surface of an ink jet receiving element which have improved durability and smudging resistance.

Ozone is generally present in the air at sea level at a concentration of about 10 to 50 parts per billion. Only under certain conditions does the ozone concentration exceed these levels. However, even at low ozone concentrations, dyes and pigments such as ink jet dyes and pigments can be very sensitive and fade significantly when the air permeability is high, such as when they are printed onto porous, glossy receivers.

Although ink jet receivers designed for outdoor usage tend to have good durability when printed with pigmented inks, they also fade significantly due to their exposure to ozone caused by high air permeability.

U.S. Pat. No. 5,716,436 and JP 2000-290553 disclose the use of water-dispersible polymers in ink jet inks which are printed onto plain paper. However, images printed with these inks have low optical densities and very poor wet abrasion resistance and will not withstand outdoor applications.

GB 2 351 292 relates to an ink jet ink composition containing a water-dissipatable polymer comprising a reaction product. However, there is no disclosure in this patent of the use of these compositions on a receiver other than plain paper.

It is an object of this invention to provide an ink jet printing method using an ink jet ink composition containing water-dispersible polymers so that images printed on the surface of an ink jet receiving element using the ink composition will have improved ozonefastness and physical durability such as scratch and smudging resistance.

SUMMARY OF THE INVENTION

These and other objects are achieved in accordance with this invention which relates to an ink jet printing method, comprising the steps of:

A) providing an ink jet printer that is responsive to digital data signals;
B) loading the printer with an ink-receiving element comprising a support having thereon a continuous, coextensive, porous ink-receiving layer having interconnecting voids;
C) loading the printer with an ink jet ink composition comprising water, a humectant, a pigment and particles of a water-dispersible polymer; and D) printing on the ink-receiving layer using the ink jet ink in response to the digital data signals.

The ink jet printing method of the invention using a porous receiver and an ink composition containing particles of a water-dispersible polymer provides images which have improved ozonefastness and physical durability such as scratch and smudging resistance.

DETAILED DESCRIPTION OF THE INVENTION

The support for the ink-receiving element employed in the invention can be paper or resin-coated paper, plastics such as a polyolefin type resin or a polyester-type resin such as poly(ethylene terephthalate), polycarbonate resins, polysulfone resins, methacrylic resins, cellophane, acetate plastics, cellulose diacetate, cellulose triacetate, vinyl chloride resins, poly(ethylene naphthalate), polyester diacetate, various glass materials, etc. or comprising an open pore structure such as those made from polyolefins or polyesters. The thickness of the support employed in the invention can be, for example, from about 12 to about 500 μm, preferably from about 75 to about 300 μm.

In a preferred embodiment of the invention, the continuous, coextensive, porous ink-receiving layer contains organic or inorganic particles. Examples of organic particles which may be used include core/shell particles such as those disclosed in U.S Ser. No. 09/609/969 of Kapusniak et al., filed Jun. 30, 2000, and homogeneous particles such as those disclosed in U.S. Ser. No. 09/608/466 of Kapusniak et al., filed Jun. 30, 2000, the disclosures of which are hereby incorporated by reference. Examples of organic particles which may be used include acrylic resins, styrenic resins, cellulose derivatives, polyvinyl resins, ethylene-allyl copolymers and polycondensation polymers such as polyesters.

Examples of inorganic particles which may be used in the invention include silica, alumina, titanium dioxide, clay, calcium carbonate, barium sulfate, or zinc oxide.

In a preferred embodiment of the invention, the porous ink-receiving layer comprises from about 20% to about 100% of particles and from about 0% to about 80% of a polymeric binder, preferably from about 80% to about 95% of particles and from about 20% to about 5% of a polymeric binder. The polymeric binder may be a hydrophilic polymer such as poly(vinyl alcohol), poly(vinyl pyrrolidone), gelatin, cellulose ethers, poly(oxazolines), poly(vinylacetamides), partially hydrolyzed poly(vinyl acetate/vinyl alcohol), poly(acrylic acid), poly(acrylamide), poly(alkylene oxide), sulfonated or phosphated polyesters and polystyrenes, casein, zein, albumin, chitin, chitosan, dextran, pectin, collagen derivatives, collodian, agar-agar, arrowroot, guar, carrageenan, tragacanth, xanthan, rhamsan and the like. Preferably, the hydrophilic polymer is poly(vinyl alcohol), hydroxypropyl cellulose, hydroxypropyl methyl cellulose, a poly(alkylene oxide), poly(vinyl pyrrolidinone), poly(vinyl acetate) or copolymers thereof or gelatin.

In order to impart mechanical durability to an ink jet recording element, crosslinkers which act upon the binder discussed above may be added in small quantities. Such an additive improves the cohesive strength of the layer. Crosslinkers such as carbodiimides, polyfunctional aziridines, aldehydes, isocyanates, epoxides, polyvalent metal cations, vinyl sulfones, pyridinium, pyridylium dication ether, methoxyalkyl melamines, triazines, dioxane derivatives, chrom alum, zirconium sulfate and the like may be used. Preferably, the crosslinker is an aldehyde, an acetal or a ketal, such as 2,3-dihydroxy-1,4-dioxane.

As used herein, a porous ink jet receiving layer is one which is usually composed of inorganic or organic particles bonded together by a binder. The amount of particles in this type of coating is often far above the critical particle volume concentration, which results in high porosity in the coating. During the ink jet printing process, ink droplets are rapidly absorbed into the coating through capillary action and the image is dry-to-touch right after it comes out of the printer. Therefore, porous coatings allow a fast "drying" of the ink and produces a smear-resistant image.

The porous ink-receiving layer can also comprise an open-pore polyolefin, an open-pore polyester or an open pore membrane. An open pore membrane can be formed in accordance with the known technique of phase inversion. Examples of porous ink-receiving layer comprising an open-pore membrane are disclosed in U.S. Ser. No. 09/626/752 and U.S. Ser. No. 09/626/883, both of Landry-Coltrain et al., filed Jul. 27, 2000.

Pigments which may be used in the invention include organic and inorganic pigments, alone or in combination, such as those as disclosed, for example in U.S. Pat. Nos. 5,026,427; 5,086,698; 5,141,556; 5,160,370; and 5,169,436, the disclosures of which are hereby incorporated by reference. The exact choice of pigments will depend upon the specific application and performance requirements such as color reproduction and image stability. Pigments suitable for use in the present invention include, for example, azo pigments, monoazo pigments, disazo pigments, azo pigment lakes, γ-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black. Typical examples of pigments which may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169,170,171, 172,173, 174, 175, 176, 177, 179, 180, 181, 182, 183, 184, 185, 187, 188, 190, 191, 192, 193, 194; C. I. Pigment Orange 1, 2, 5, 6, 13, 15, 16, 17, 17:1, 19, 22, 24, 31, 34, 36, 38, 40, 43, 44, 46, 48,49, 51, 59, 60, 61,62,64,65,66, 67,68, 69; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Violet 1, 2, 3, 5:1, 13, 19, 23, 25, 27, 29, 31, 32, 37, 39, 42, 44, 50; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66; C.I. Pigment Green 1, 2, 4, 7, 8, 10, 36, 45; C.I. Pigment Black 1, 7, 20, 31, 32, and C.I. Pigment Brown 1, 5, 22, 23, 25, 38, 41, 42. In a preferred embodiment of the invention, the pigment employed is C.I. Pigment Blue 15:3, C.I. Pigment Red 122, C.I. Pigment Yellow 155, C.I. Pigment Yellow 74, bis (phthalocyanylalumino)tetraphenyldisiloxane or C.I. Pigment Black 7.

The aqueous carrier medium for the ink composition employed in the invention is water or a mixture of water and at least one water miscible co-solvent. Selection of a suitable mixture depends on the requirements of the specific application, such as desired surface tension and viscosity, the selected pigment, drying time of the pigmented ink jet ink, and the type of paper onto which the ink will be printed. Representative examples of water-miscible co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, tetraethylene glycol, propylene glycol, polyethylene glycol, glycerol, 2-methyl-2,4-pentanediol 1,2,6-hexanetriol and thioglycol; (6) lower alkyl mono- or di-ethers derived from alkylene glycols, such as ethylene glycol mono-methyl (or -ethyl) ether, diethylene glycol mono-methyl (or -ethyl) ether, diethylene glycol mono-butyl (or -ethyl) ether, propylene glycol mono-methyl (or -ethyl) ether, poly(ethylene glycol) butyl ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide, 2,2'-thiodiethanol, and tetramethylene sulfone.

In general it is desirable to make a pigmented ink jet ink in the form of a concentrated mill grind, which is subsequently diluted to the appropriate concentration for use in the ink jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to the desired concentration. By dilution, the ink is adjusted to the desired viscosity, color, hue, saturation density, and print area coverage for the particular application. The method for the preparation of the mill grind is disclosed in U.S. Pat. Nos. 5,679,138; 5,670,139 and 6,152,999, the disclosures of which are hereby incorporated by reference. In a preferred embodiment of the invention, a dispersant is also added to the ink jet ink composition and is used to break down the pigment to sub-micron size during the milling process and keeps the colloidal dispersion stable and free from flocculation for a long period of time.

In the case of organic pigments, the ink may contain up to approximately 30% pigment by weight, but will generally be in the range of approximately 0.1 to 10%, preferably approximately 0.1 to 5%, by weight of the total ink composition for most inkjet printing applications. If an inorganic pigment is selected, the ink will tend to contain higher weight percentages of pigment than with comparable inks employing organic pigments, and may be as high as approximately 75% in some cases, since inorganic pigments generally have higher specific gravities than organic pigments.

The amount of aqueous carrier medium employed is in the range of approximately 70 to 99 weight %, preferably approximately 90 to 98 weight %, based on the total weight of the ink. A mixture of water and a polyhydric alcohol, such as diethylene glycol, is useful as the aqueous carrier medium. In a preferred embodiment, the inks contain from about 5 to about 60 weight % of water miscible organic solvent. Percentages are based on the total weight of the aqueous carrier medium.

The particles of a water-dispersible polymer employed in the invention in general have an average particle size of less than 1 $\mu$m, preferably less than 0.5 $\mu$m, more preferably less than 0.25 $\mu$m.

The water-dispersible polymers used in this invention are generally hydrophobic polymers of any composition that can be stabilized in a water-based medium. Such hydrophobic polymers are generally classified as either condensation polymer or addition polymers. Condensation polymers include, for example, polyesters, polyamides, polyurethanes, polyureas, polyethers, polycarbonates, polyacid anhydrides, and polymers comprising combinations of the above-mentioned types. Addition polymers are polymers formed from polymerization of vinyl-type monomers including, for example, allyl compounds, vinyl ethers, vinyl heterocyclic compounds, styrenes, olefins and halogenated olefins, ethylenically unsaturated carboxylic acids and esters derived from them, unsaturated nitriles, vinyl alcohols, acrylamides and methacrylamides, vinyl ketones, multifunctional monomers, or copolymers formed from various combinations of these monomers.

A first class of preferred water-dispersible polymers includes those styrene/acrylic polymers prepared by free-radical polymerization of vinyl monomers in aqueous emulsion. Suitable monomers for the styrene/acrylic polymers are well known in the art as disclosed, for example, in U.S. Pat. No. 5,594,047, the disclosure of which is hereby incorporated by reference. In a preferred embodiment of the invention, the monomer for the styrene/acrylic polymer is an ester of acrylic acid, an ester of methacrylic acid, styrene or a styrene derivative.

For example, the monomer for the styrene/acrylic polymer may be formed from methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, 2-hydroxypropyl methacrylate, acrylonitrile, methacrylonitrile, vinyl acetate, vinyl propionate, vinylidene chloride, vinyl chloride, styrene, t-butyl styrene, vinyl toluene, butadiene, isoprene, N,N-dimethyl acrylamide, acrylic acid, methacrylic acid, chloromethacrylic acid, maleic acid, allylamine, N,N-diethylallylamine, vinyl sulfonamide, sodium acrylate, sodium methacrylate, ammonium acrylate, ammonium methacrylate, acrylamidopropane-triethylammonium chloride, methacrylamidopropane-triethylammonium chloride, vinyl-pyridine hydrochloride, sodium vinyl phosphonate and sodium 1-methylvinylphosphonate, sodium vinyl sulfonate, sodium 1-methylvinyl-sulfonate, sodium 2-acrylamido-2-methyl-1-propanesulfonate or sodium styrenesulfonate.

A second class of water-dispersible polymers which may be used in the invention include aqueous dispersible polyester ionomers. In a preferred embodiment, the polyester ionomers have the following general formula:

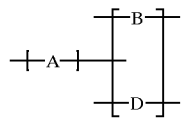

wherein:

A is the residue of one or more diol components which together comprise 100 mole % of recurring units and is represented by the following structure:

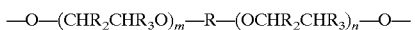

wherein:
m and n independently represent an integer from 0–4; $R_1$ represents S, an alkylene group of 1 to about 16 carbon atoms; a cycloalkylene group of 5 to about 20 carbon atoms; a cyclobisalkylene group of about 8 to about 20 carbon atoms, a bi- or tri-cycloalkylene group of about 7 to about 16 carbon atoms, a bi- or tri-cyclobisalkylene group of about 9 to about 18 carbon atoms, an arenebisalkylene group of from 8 to about 20 carbon atoms or an arylene group of 6 to about 12 carbon atoms, a carbinol-terminated polydimethylsiloxane segment; and $R_2$ and $R_3$ each independently represents H, a substituted or unsubstituted alkyl group of about 1 to about 6 carbon atoms or a substituted or unsubstituted aryl group of about 6 to about 12 carbon atoms; B is the residue of a diacid component which comprises 8 to 50 mole % of recurring units and is represented by one or more of the following structures:

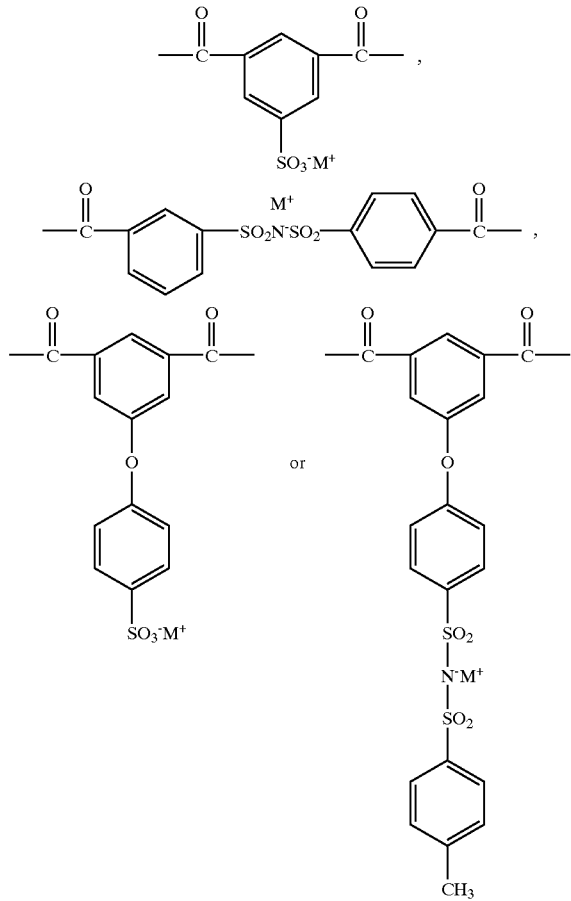

wherein:
$M^+$ represents alkali metals, such as Li, Na and K; ammonium groups such as ammonium, methylammonium, triethylammonium, tetralkylammonium, aryltrialkylammonium, etc.; phosphonium groups such as triphenylphospho-nium; tetrabutylphosphonium; heteroaromatic ammonium groups such as pyridinium, imidazolium and N-methylammonium; sulfonium groups; guanidinium groups; amidinium groups, etc.; and D is the residue of a diacid component which comprises 50 to 92 mole % of recurring units and is represented by one or more of the following structures:

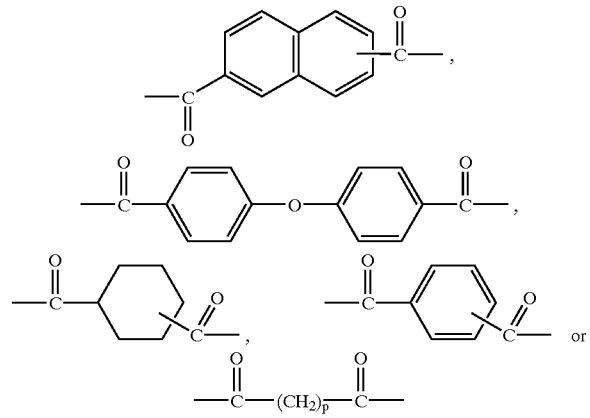

wherein p represents an integer from 2 to 12.

Some typical diols which A in the above formula represents include ethylene glycol, diethylene glycol, triethylene glycol, thiodiethanol, cyclohexanedimethanol, bisphenol A, trans-1,4-cyclohexanediol, dodecanediol, cis-exo-2,3-norbornanediol, 5-norbornene-2,2-dimethanol, hydroquinone bis(2-hydroxyethylether), carbinol terminated polydimethylsiloxane, MW=1000 (DMS-C15), (Gelest Inc.), etc.

Specific examples of water-dispersible polyesters useful in the invention include Eastman AQ® polyesters, (Eastman Chemical Company). Eastman Polyesters AQ 29, AQ 38, and AQ 55 are composed of varying amounts of isophthalic acid, sodium sulfoisophthalic acid, diethylene glycol, and 1,4-cyclohexanedimethanol. These thermoplastic, amorphous, ionic polyesters are prepared by a melt-phase condensation polymerization at high temperature and low pressure, and the molten product is extruded into small pellets. The solid polymer disperses readily in water at 70° C. with minimal agitation to give translucent, low viscosity dispersions containing no added surfactants or solvents. Varying the amount of ionic monomers, i.e., sulfoisophthalic acid, can control the particle size. The particle sizes range from 0.02 to 0.1 μm.

A third class of water-dispersible polymers which may be used in the invention include aqueous dispersible polyurethanes. Examples of useful polyurethanes are disclosed in U.S. patent application, Ser. No.09/548,514, filed Apr. 13, 2000, of Yacobucci et al., the disclosure of which is hereby incorporated by reference. These materials may be prepared as described in "Polyurethane Handbook," Hanser Publishers, Munich Vienna, 1985. Examples of aqueous dispersible polyurethanes are Witcobond® polyurethane dispersion by Witco Corp. and Sancure® polyurethane by BF Goodrich Company.

A fourth class of water-dispersible polymers which may be used in this invention include polyurethane-acrylic polymer alloys. Examples of useful polyurethane-acrylic polymer alloy dispersions are disclosed in U.S. Pat. No. 5,173,526, the disclosure of which is hereby incorporated by reference. An example of this type of material is Witcobond A-100 by CK Witco Corporation, which is an alloyed aliphatic polyester based urethane and a polyacrylate.

The water-dispersible polymer used in the invention is present in the ink jet ink generally from about 0.1% to about 10% by weight, preferably from about 0.5% to about 5% by weight.

It has been observed that, in general, the addition of water-dispersible polymer particles in inks can be used to increase the gloss level of the receiver surface in the printed areas after the inks have being printed onto it.

Jet velocity, separation length of the droplets, drop size and stream stability are greatly affected by the surface tension and the viscosity of the ink. Pigmented ink jet inks suitable for use with ink jet printing systems should have a surface tension in the range of about 20 dynes/cm to about 60 dynes/cm and, more preferably, in the range 30 dynes/cm to about 50 dynes/cm. Control of surface tensions in aqueous inks is accomplished by additions of small amounts of surfactants. The level of surfactants to be used can be determined through simple trial and error experiments. Anionic and cationic surfactants may be selected from those disclosed in U.S. Pat. Nos. 5,324,349; 4,156,616 and 5,279,654 as well as many other surfactants known in the ink jet ink art. Commercial surfactants include the Surfynols® from Air Products; the Zonyls® from DuPont and the Fluorads® from 3M.

A humectant is added to the composition employed in the process of the invention to help prevent the ink from drying out or crusting in the orifices of the ink jet printhead. Polyhydric alcohol humectants useful in the composition employed in the invention for this purpose include, for example, ethylene glycol, diethylene glycol, triethylene glycol, propylene glycol, tetraethylene glycol, polyethylene glycol, glycerol, 2-methyl-2,4-pentanediol, 1,2,6-hexanetriol and thioglycol. The humectant may be employed in a concentration of from about 10 to about 50% by weight. In a preferred embodiment, diethylene glycol or a mixture of glycerol and diethylene glycol is employed at a concentration of between 10 and 20% by weight.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

A penetrant (0–10% by weight) may also be added to the ink composition employed in the process of the invention to help the ink penetrate the receiving substrate, especially when the substrate is a highly sized paper. A preferred penetrant for the inks employed in the present invention is n-propanol at a final concentration of 1–6% by weight.

A biocide (0.01–1.0% by weight) may also be added to the ink composition employed in the process of the invention to prevent unwanted microbial growth which may occur in the ink over time. A preferred biocide for the inks employed in the present invention is Proxel® GXL (Zeneca Colours Co.) at a concentration of 0.05–0.5% by weight. Additional additives which may optionally be present in ink jet inks include thickeners, conductivity enhancing agents, antikogation agents, drying agents, and defoamers.

Ink jet inks made using water-dispersible polymers employed in this invention are employed in ink jet printing wherein liquid ink drops are applied in a controlled fashion to an ink receiving substrate, by ejecting ink droplets from plurality of nozzles, or orifices, in a print head of ink jet printers.

Commercially available ink jet printers use several different methods to control the deposition of the ink droplets. Such methods are generally of two types: continuous stream and drop-on-demand.

In drop-on-demand systems, a droplet of ink is ejected from an orifice directly to a position on the ink receiving layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

The following examples illustrate the utility of the present invention.

EXAMPLES

Example 1

The following pigment dispersions were prepared:

| Magenta Pigment Dispersion (MD-1) | |
|---|---|
| Mill Grind | |
| Polymeric beads, mean diameter of 50 micron (milling media) | 325 g |
| Quinacridone magenta (Pigment Red 122) from Sun Chemical Co. | 30 g |
| Oleoyl methyl taurine, (OMT) potassium salt | 9 g |
| Deionized water | 208 g |
| Proxel GXL ® (biocide from Zeneca) | 0.2 g |

The above components were milled in a 2 liter double walled vessel obtained from BYK-Gardner using a high energy media mill manufactured by Morehouse-Cowles Hochmeyer. The mill was run for approximately 8 hours at room temperature. The dispersion was separated from the milling media by filtering the millgrind through a 4–8 $\mu$m KIMAX® Buchner Funnel obtained from VWR Scientific Products.

Cyan Pigment Dispersion (CD-1)

This dispersion was prepared the same as the magenta pigment dispersion except that bis(phthalocyanylalumino) tetraphenyldisiloxane (Eastman Kodak Co.) was used instead of the magenta pigment and 18 g of OMT was used.

Yellow Pigment Dispersion (YD-1)

This dispersion was prepared the same as the magenta pigment dispersion except that Pigment Yellow 74 (Clariant Corporation) was used instead of the magenta pigment and 3.75 g of OMT was used.

Preparation of Water-Dispersible Polymers

Polyester Dispersion 1 (PE-1)

A 500-mL, 3-necked round-bottomed flask fitted with a mechanical stirrer, efficient reflux condenser, and $N_2$ inlet was charged with 28.96 g of sodium 5-sulfoisophthalic acid, 81.74 g of isophthalic acid, 45.37 g of diethylene glycol, and 46.51 g of cyclohexanedimethanol. The flask was placed in a salt bath at 220° C. under a slight $N_2$ flow and with slow stirring. When the reaction mixture had melted, 0.51 g of Fascat 4100® catalyst was added, and the polymerization allowed to proceed for 8.0 hr, when the theoretical volume of water had distilled over. The copolymer was allowed to cool under a $N_2$ atmosphere, and then the polymer was broken out of the flask.

A 250-mL, 3-necked round-bottomed flask fitted with a mechanical stirrer and reflux condenser was charged with 80 mL of deionized water and heated to 85° C. With rapid stirring, 20.3 g of the polyester ionomer above was added gradually and the dispersion was heated at 85° C. for 2 hr. The heat was removed, and the dispersion was stirred at room temperature overnight. The mixture was filtered, affording 92.5 g of a slightly hazy dispersion containing 18.7 percent of polymer by weight.

Polyester Dispersion 2 (PE-2)

A 500-mL, 3-necked round-bottomed flask fitted with a mechanical stirrer, efficient reflux condenser, and $N_2$ inlet was charged with 28.96 g of sodium 5-sulfoisophthalic acid, 81.74 g of isophthalic acid, 41.72 g of diethylene glycol, and 42.77 g of cyclohexanedimethanol. The flask was placed in a salt bath at 220° C. under a slight $N_2$ flow and with slow stirring. When the reaction mixture had melted, 0.49 g of Fas cat 4100® catalyst was added, and the polymerization allowed to proceed for 8.0 hr, when the theoretical volume of water had distilled over. The copolymer was allowed to cool under a $N_2$ atmosphere, and then the polymer was broken out of the flask.

A 250-mL, 3-necked round-bottomed flask fitted with a mechanical stirrer and reflux condenser was charged with 80 mL of deionized water and heated to 85° C. With rapid stirring, 20.1 g of the polyester ionomer above was added gradually and the dispersion was heated at 85° C. for 2 hr. The heat was removed, and the dispersion was stirred at room temperature for 20 hr. The mixture was filtered, affording 90.0 g of a slightly hazy dispersion containing 19.1 percent of polymer by weight.

Polyester Dispersion 3 (PE-3)

Solid AQ-55 polyester ionomer was purchased from Eastman Chemical, and then added to water with heat and agitation to obtain AQ-55 dispersion at 30% solids in concentration.

Polyester Dispersion 4 (PE-4)

Polyester Dispersion 4 was prepared following the same procedure as for Polyester Dispersion 2, except that the starting materials used were 164.29 g 1,4-cyclohexane dicarboxylic acid, 46.30 g sodium sulfo isophthalic acid, 90.24 g cyclohexanedimethanol and 61.47 g 1,1 0-decanediol.

Polyurethane Dispersion 1 (PU-1)

In a 500 Ml flask equipped with a stirrer, nitrogen inlet and a condenser was charged with 148.12 g sodium sulfoisophthalic acid, 530.00 g Tone® 0200 (a polycaprolactone polyol, molecular weight of 530, available from Union Carbide) and titanium(IV) isopropoxide at 200 PPM. With stirring, the mixture was heated to 250° C. When the mixture was clear (approx. 2 hrs), the temperature was increased to 270° C. and maintained for 2 additional hours. When approximately 15.8 g of methanol condensate was collected, transesterification was considered essentially complete. The reaction product (called SIP-diol hereafter) was bottled and used without further purification.

A 2-liter resin flask equipped with thermometer, stirrer, water condenser and a vacuum outlet was charged with 245.48 grams (0.19 moles) of SIP-diol and dewatered under vacuum at 100° C. The flask was placed in a controlled temperature bath. Vacuum was released and at 40° C., 54.79 grams (0.24 moles) of bisphenol-A, 64.89 grams (0.72 moles) 1,4-butanediol, 150 grams of 2-butanone and 40 drops of dibutyltin dilaurate (catalyst) were added in the reaction flask while stirring. The temperature was raised to 82° C. to obtain a homogeneous solution, cooled to 70° C., followed by the addition of 226.74 grams (1.02 moles) of isophorone diisocyanate and 10 grams of 2-butanone.

The temperature was adjusted back to 82° C. and maintained for 16 hours to complete the reaction, resulting in a final polyurethane containing less than 3% free isocyanate. The free isocyanate content was monitored by Infrared spectroscopy of the absorption peak at 2240 wave number. 2000 grams of water was added to the reaction flask under high shear to form a stable aqueous dispersion. 2-Butanone was removed by heating under vacuum to give an aqueous dispersion at 40% solids.

Polyurethane Dispersion 2 (PU-2)

In a 2-liter resin flask equipped with thermometer, stirrer, water condenser and a vacuum outlet, was placed 123.0 g (0.041 moles) Tone® 0260 (a polycaprolactone polyol, molecular weight of 3000, available from Union Carbide). It was dewatered under vacuum at 100° C. The vacuum was released and the following were added at 40° C. while stirring: 22.27 g (0.166 moles) dimethylol propionic acid, 50.90 g (0.241 moles) bisphenol-A, 63.58 g (0.706 moles) 1,4-butanediol, 180 g 2-butanone and 20 drops of dibutyltin dilaurate (catalyst). The temperature was adjusted to 80° C., and when a homogeneous solution was obtained, 226.74 g (1.02 moles) of isophorone diisocyanate was added followed by 10 grams of 2-butanone. The temperature was increased to 82° C. and maintained for about 16 hours to complete the reaction, resulting in an intermediate containing less than 3% free isocyanate.

The free isocyanate content was monitored by Infrared spectroscopy of the absorption peak at 2240 wave number. The reaction mixture was diluted with 75 g tetrahydrofuran and neutralized with 19.7 g of 45% potassium hydroxide solution to achieve 95% stoichiometric ionization based on dimethylol propionic acid. 1300 g of distilled water was added to the neutralized mixture under high shear to form a stable aqueous dispersion followed by evaporation under vacuum to remove 2-butanone.

Polyurethane Dispersion 3 (PU-3)

Polyurethane Dispersion 3 was prepared the same as Polyurethane Dispersion 2, except that the starting materials used were 51.6 g KM101733, a polycarbonate polyol, m.w. 860 (Stahl Co.) 10.20 g dimethylol propionic acid, 10.0 g 2,2-oxydiethanol, 24.33 g 1,4-butanediol, and 111.20 g isophorone diisocyanate.

Polyacrylic Dispersion 1 (PA-1)

400 g of deionized water and 0.6 g Olin 10® surfactant were charged to a 1-liter, three-neck round-bottom flask equipped with a mechanical stirrer and nitrogen inlet. The solution was purged with nitrogen for 30 min and heated to 80° C. in a constant temperature bath. 172.8 g of methyl acrylate and 7.2 g of 2-acrylamido-2-methyl-1-propanesufonic acid(sodium salt) were added and stirred for three minutes. 16.4 g of 10% sodium persulfate solution and 5.5 g of 10% sodium metabisulfite solution were added to initiate the polymerization. Polymerization was continued for one hour and heated one more hour at 80° C. The temperature was reduced to 65–70° C. and 1 ml each of t-butyl hydroperoxide (10%) and sodium formaldehyde bisulfite (10%) were post-added. The latex was cooled and filtered. The dispersion contains 30% solids by weight.

Polyacrylic Dispersion 2 (PA-2)

Polyacrylic Dispersion 2 was prepared the same as Polyacrylic Dispersion 1, except that the monomer mixture consisted of 14.17 g methacrylamide, 106.2 g butyl acrylate, 14.17 g 2-acrylamido-2-methyl-1-propanesufonic acid (sodium salt) and 45.36 g styrene, and the surfactant used was sodium lauryl sulfate instead of Olin 10G. The dispersion contains 30% solids by weight.

Polyacrylic Dispersion 3 (PA-3)

Polyacrylic dispersion 3 was prepared by mixing 25 grams of Jonrez IJ4655 (a styrene-acrylic polymer obtained from Westvaco Corporation) with 66 grams of water and 9 grams of triethanolamine until the polymer was completely dissolved.

Polymer Characterization
Glass Transition Temperature

Glass transition temperature (Tg) of the dry polymer material was determined by differential scanning calorimetry (DSC), using a heating rate of 20° C./minute. Tg is defined herein as the inflection point of the glass transition. Particle Size Measurement All particles were characterized by a 90plus Particle Sizer manufactured by Brookhaven Instruments Corporation. The volume mean diameters are listed below.

Average Molecular Weight:

The samples were analyzed by size-exclusion chromatography (SEC) in tetrahydrofuran using three Polymer Laboratories Plgel® mini-mixed-B columns. The column set was calibrated with narrow molecular weight distribution polystyrene standards between 580 and 2,300,000.

The polymer properties are summarized in Table 1 below.

TABLE 1

| Polymer Dispersion | Particle Size (nm) | Tg of Dry Polymer (° C.) | Weight Average Molecular Weight |
|---|---|---|---|
| Polyester Dispersion 1 | 308 | 23 | 3,400 |
| Polyester Dispersion 2 | 295 | 38 | 4,125 |
| Polyester Dispersion 3 | 19.9 | 55 | 18,000 |
| Polyester Dispersion 4 | 110.2 | 6 | 10,400 |
| Polyurethane Dispersion 1 | 143.2 | 44 | 5,580 |
| Polyurethane Dispersion 2 | 18.0 | 80 | 17,400 |
| Polyurethane Dispersion 3 | 8.2 | 71 | 20,600 |
| Polyacrylic Dispersion 1 | 100 | 25 | >1,000,000 |
| Polyacrylic Dispersion 2 | 86 | 0 | >1,000,000 |

Ink Preparation

An ink formulation employed in this invention was prepared by 5 mixing all ingredients with mild stirring at room temperature. The pH of the final mixture was adjusted to 8.5 by the addition of triethanolamine. In addition to pigment and water-dispersible polymer, the ink also contained glycerol at 10%, triethylene glycol at 23% and Dowanol DPM® at 2.5%, all by weight.

The pigments and water-dispersible polymers used in the inks employed in this invention and three comparison inks are given in the following Table 2:

TABLE 2

| Ink | Polymer Dispersion (wt. % in ink) | Pigment Dispersion (wt. % in ink) |
|---|---|---|
| C-1 (Control) | None | CD-1(2.5) |
| C-2 (Control) | None | MD-1(2.9) |
| C-3 (Control) | None | YD-1(2.9) |
| I-1 | PE-1(2.5) | CD-1(2.5) |
| I-2 | PE-2(2.5) | CD-1(2.5) |
| I-3 | PE-3(2.5) | CD-1(2.5) |
| I-4 | PA-1(2.5) | CD-1(2.5) |
| I-5 | PA-2(2.5) | CD-1(2.5) |
| I-6 | PU-3(2.5) | CD-1(2.5) |
| I-7 | PE-3(2.5) | MD-1(2.9) |
| I-8 | PE-4(2.5) | MD-1(2.9) |
| I-9 | PU-2(2.0) | MD-1(2.9) |
| I-10 | PA-3(2.0) | MD-1(2.9) |
| I-11 | PE-1(2.5) | MD-1(2.9) |
| I-12 | PU-1(2.0) | MD-1(2.9) |
| I-13 | PA-3(2.0) | YD-1(2.9) |

Ink Jet Recording Elements

Receiver 1 was Xerox 4024DP plain paper (control).

Receiver 2 was a porous glossy receiver consisting of two layers on a polyethylene-coated paper. The bottom layer consisted of fumed alumina, Cab-O-Sperse PG003 ®, (Cabot Corp.), polyvinyl alcohol, GH-23, (Nippon Ghosei) and 2,3-dihydroxy-1,4-dioxane (Clariant Corp.) at a weight ratio of 87:9:4 and a thickness of 38 μm. The top layer consisted of fumed alumina, Cab-O-Sperse PG003 ®, (Cabot Corp.), polyvinyl alcohol, GH-23, (Nippon Ghosei), surfactant Zonyl FSN ® (DuPont Corp.) and dye mordanting material MM (see description below) at a weight ratio of 69:6:5:20 and a thickness of 2 μm.

MM was a crosslinked hydrogel polymer particle of 80 nm in average particle size prepared from 87% by weight of N-vinylbenzyl-N,N,N-trimethylammonium chloride and 13% by weight of divinylbenzene.

Receiver 3 was Epson Photoglossy Paper® SP91001, (Epson Corporation), which is a porous, glossy receiver.

Receiver 4 was EI Flame Retardant Banner (Eastman Kodak Company) for outdoor applications.

Receiver 5 was EI Water Resistant Self-Adhesive Vinyl (Eastman Kodak Company) for outdoor applications.

Receivers 2 to 5 are all ink receiving elements consisting of a continuous, coextensive, porous ink receiving layer on a support.

Preparation of Coated Elements Inks were coated on Receiver 2 described above at 16.3 cc per square meter, and the elements were allowed to dry in room condition of 20° C. completely before testing.

Wet and Dry Rub Resistance

The above inks were coated on the above ink jet recording elements. A wet rub resistance test was carried out by placing an approximately 2.54 cm diameter water droplet on the ink-coated sample surface for 2 minutes, after which the excess water was gently wiped off using a paper towel. The above treated area was then rubbed with a dry paper towel for 8 passes under a pressure of 200 grams over a 3.5 cm diameter area. Status A reflectance density as measured by an X-Rite® densitometer on the tested area was recorded and compared to the optical density before testing. Wet rub resistance is defined as the percentage of optical density (OD) retained after testing. A wet rub resistance of 70% or higher is desirable.

A dry rub resistance test was carried out by rubbing the samples with a dry paper towel for 8 passes under a pressure of 200 grams over a 3.5 cm diameter area. Status A reflectance density as measured by an X-Rite® densitometer on the tested area was recorded and compared to the optical density before testing. Dry rub resistance is defined as the percentage of optical density (OD) retained after testing. A dry rub resistance of 80% or higher is desirable. The results are listed in Table 3 below.

Ozonefastness Test:

Samples were stored in an ozone chamber (5 ppm ozone level, 50% relative humidity, 21 C) for 48 or 96 hours. The Status A reflection densities were measured using an X-Rite® 414 densitometer before and after the ozone exposure test. The % retained Status A densities were calculated and reported in Table 3 below. Higher values are desirable, indicating better stability of images to ozone exposure.

TABLE 3

| Ink No. | Polymer in Ink | Pigment in Ink | Wet Durability (% density retained) | Dry Durability (% density retained) | Ozonefastness (48 hours, % density retained) |
|---|---|---|---|---|---|
| C-1 | None | CD-1 | 57 | 52 | 29 |
| I-1 | PE-1 | CD-1 | 69 | 110 | 108 |
| I-2 | PE-2 | CD-1 | 76 | 89 | 101 |
| I-3 | PE-3 | CD-1 | 67 | 96 | 102 |
| I-4 | PA-1 | CD-1 | 94 | 106 | 104 |
| I-5 | PA-2 | CD-1 | 51 | 87 | 98 |
| I-6 | PU-3 | CD-1 | 103 | 104 | 102 |
| C-2 | None | MD-1 | 30 | 63 | 94 |
| I-7 | PE-3 | MD-1 | 71 | 99 | 98 |
| I-8 | PE-4 | MD-1 | 99 | 102 | 99 |
| I-9 | PU-2 | MD-1 | 90 | 100 | 99 |
| I-10 | PA-3 | MD-1 | 62 | 92 | 96 |
| C-3 | None | YD-1 | 73 | 68 | 100 |
| I-13 | PA-3 | YD-1 | 93 | 95 | 102 |

The above results show that the elements using porous glossy receiver 2 and inks containing water-dispersible polymers in accordance with the invention had improved rub resistance and ozonefastness as compared to the comparison elements.

Example 2

A series of inks having the ingredients shown below were added to empty Hewlett-Packard HP 692C ink cartridges and loaded into an HP 692C printer to print on several different receivers. These samples were tested for wet durability and ozonefastness. The results are shown in Table 4.

TABLE 4

| Ink | Polymer | Pigment | Receiver | Optical Density of printed sample | Wet Durability (% density retained) | Ozonefastness (96 hours, % density retained) |
|---|---|---|---|---|---|---|
| C-2 | None | MD-1 | 1 (Control) | 0.94 | Paper disintegrated | 92 |
| I-11 | PE-1 | MD-1 | 1 (Control) | 0.89 | Paper disintegrated | 94 |
| I-7 | PE-3 | MD-1 | 1 (Control) | 0.92 | Paper disintegrated | 98 |
| I-12 | PU-1 | MD-1 | 1 (Control) | 0.90 | Paper disintegrated | 94 |
| C-2 | None | MD-1 | 2 | 2.41 | 16 | 91 |
| I-11 | PE-1 | MD-1 | 2 | 2.36 | 74 | 98 |
| I-7 | PE-3 | MD-1 | 2 | 2.50 | 82 | 100 |
| I-12 | PU-1 | MD-1 | 2 | 1.89 | 53 | 98 |
| C-2 | None | MD-1 | 3 | 2.24 | 65 | 88 |
| I-11 | PE-1 | MD-1 | 3 | 2.04 | 72 | 97 |
| I-7 | PE-3 | MD-1 | 3 | 2.29 | 94 | 99 |
| I-12 | PU-1 | MD-1 | 3 | 1.82 | 96 | 96 |
| C-2 | None | MD-1 | 4 | 1.30 | 100 | 84 |
| I-11 | PE-1 | MD-1 | 4 | 1.28 | 100 | 86 |
| I-7 | PE-3 | MD-1 | 4 | 1.31 | 100 | 92 |
| I-12 | PU-1 | MD-1 | 4 | 1.30 | 100 | 86 |
| C-2 | None | MD-1 | 5 | 1.25 | 100 | 83 |
| I-II | PE-1 | MD-1 | 5 | 1.18 | 100 | 84 |
| I-7 | PE-3 | MD-1 | 5 | 1.19 | 100 | 92 |
| I-12 | PU-1 | MD-1 | 5 | 1.24 | 100 | 86 |

The above results show that inks printed on plain paper (receiver 1) produced images of low optical density and inferior durability, while higher densities and better durability were observed when printed on ink jet receivers 2 through 5. In addition, an improvement in ozonefastness was observed when inks employed in this invention containing water-dispersible polymers were used.

Example 3

A series of inks having the ingredients shown below were added to empty Hewlett-Packard HP 692C ink cartridges and loaded into an HP 692C printer to ink jet print on receivers 2–5. These samples were tested for ozonefastness and the results are shown in Table 5.

TABLE 5

| Ink | Polymer | Pigment | Receiver | Ozonefastness (96 hours, % density retained) |
|---|---|---|---|---|
| C-1 | None | CD-1 | 2 | 73 |
| I-1 | PE-1 | CD-1 | 2 | 99 |
| I-2 | PE-2 | CD-1 | 2 | 98 |
| I-3 | PE-3 | CD-1 | 2 | 98 |
| C-1 | None | CD-1 | 3 | 61 |
| I-1 | PE-1 | CD-1 | 3 | 99 |
| I-2 | PE-2 | CD-1 | 3 | 98 |
| I-3 | PE-3 | CD-1 | 3 | 98 |
| C-1 | None | CD-1 | 4 | 41 |
| I-1 | PE-1 | CD-1 | 4 | 93 |
| I-2 | PE-2 | CD-1 | 4 | 91 |
| I-3 | PE-3 | CD-1 | 4 | 94 |
| C-1 | None | CD-1 | 5 | 49 |
| I-1 | PE-1 | CD-1 | 5 | 69 |
| I-2 | PE-2 | CD-1 | 5 | 67 |
| I-3 | PE-3 | CD-1 | 5 | 80 |

The above results show that inks employed in this invention containing water-dispersible polymers have greatly improved ozonefastness.

The invention has been described in detail with particular reference to certain preferred embodiments thereof, but it will be understood that variations and modifications can be effected within the spirit and scope of the invention.

What is claimed is:

1. An ink jet printing method, comprising the steps of:

A) providing an ink jet printer that is responsive to digital data signals;

B) loading said printer with an ink-receiving element comprising a support having thereon a continuous, coextensive, porous ink-receiving layer having interconnecting voids;

C) loading said printer with an ink jet ink composition comprising water, a humectant, a pigment and particles of a water-dispersible polymer; and D) printing on said ink-receiving layer using said ink jet ink in response to said digital data signals, said water-dispersible polymer comprising a polyurethane, a polyacrylate or a polyester ionomer having the following general formula:

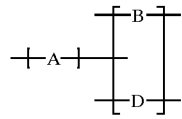

wherein:

A is the residue of one or more diol components which together comprise 100 mole % of recurring units and is represented by the following structure:

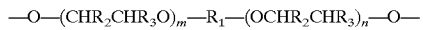

wherein:

m and n independently represent an integer from 0–4; $R_1$ represents S, an alkylene group of 1 to 16 carbon atoms; a cycloalkylene group of 5 to 20 carbon atoms; a cyclobisalkylene group of 8 to 20 carbon atoms, a bi- or tri-cycloalkylene group of 7 to 16 carbon atoms, a bi- or tri-cyclobisalkylene group of 9 to 18 carbon atoms, an arenebisalkylene group of from 8 to 20 carbon atoms or an arylene group of 6 to 12 carbon atoms, a carbinol-terminated polydimethylsiloxane segment; and $R_2$ and $R_3$ each independently represents H, a substituted or unsubstituted alkyl group of 1 to 6 carbon atoms or a substituted or unsubstituted aryl group of 6 to 12 carbon atoms; B is the residue of a diacid component which comprises 8 to 50 mole % of recurring units and is represented by one or more of the following structures:

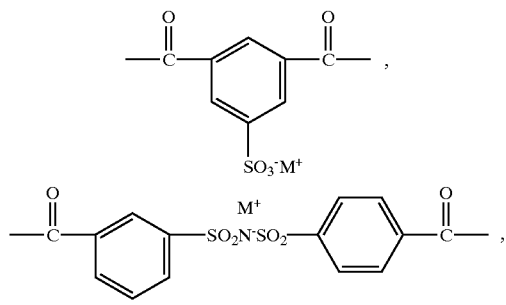

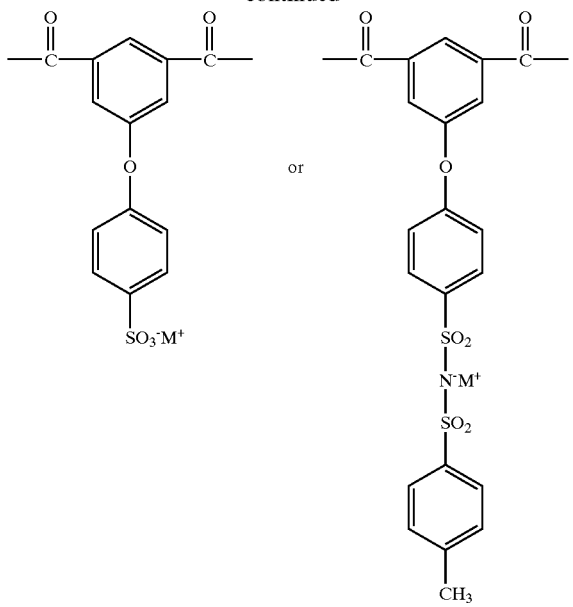

wherein:

$M^+$ represents an alkali metal; an ammonium group; a phosphonium group; a heteroaromatic ammonium group; a sulfonium group; a guanidinium group; or an amidinium group; and D is the residue of a diacid component which comprises 50 to 92 mole % of recurring units and is represented by one or more of the following structures:

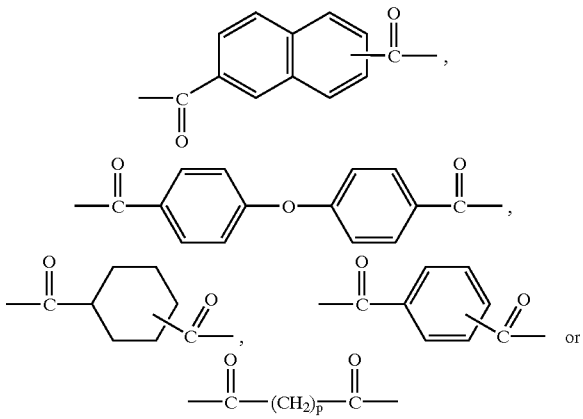

wherein p represents an integer from 2 to 12.

2. The method of claim 1 wherein said porous ink-receiving layer comprises from about 20% to about 100% of particles and from about 0% to about 80% of a polymeric binder.

3. The method of claim 1 wherein said porous ink-receiving layer comprises from about 50% to about 95% of particles and from about 50% to about 5% of a polymeric binder.

4. The method of claim 2 wherein said particles comprise silica, alumina, titanium dioxide, clay, calcium carbonate, barium sulfate or zinc oxide.

5. The method of claim 2 wherein said polymeric binder is poly(vinyl alcohol), hydroxypropyl cellulose, hydroxypropyl methyl cellulose, a poly(alkylene oxide), poly(vinyl pyrrolidinone), poly(vinyl acetate) or copolymers thereof, or gelatin.

6. The method of claim 1 wherein said porous ink-receiving layer contains organic particles.

7. The method of claim 1 wherein said continuous, coextensive, porous ink-receiving layer having interconnecting voids comprises a polymeric open-pore membrane.

8. The method of claim 1 wherein said particles of said water-dispersible polymer have an average diameter of less than 0.25 µm.

9. The method of claim 1 wherein said particles of said water-dispersible polymer comprises from about 0.1% to about 10% by weight of said ink.

10. The method of claim 1 wherein said particles of said water-dispersible polymer comprises from about 0.5% to about 5% by weight of said ink.

11. The method of claim 1 wherein said pigment is C.I. Pigment Blue 15:3, C.I. Pigment Red 122, C.I. Pigment Yellow 155, C.I. Pigment Yellow 74, bis(phthalocyanylalumino)tetraphenyldisiloxane or C.I. Pigment Black 7.

12. The method of claim 1 wherein the surface of said ink-receiving element has a 20° specular gloss of from about 5 to about 100.

13. The method of claim 1 wherein said pigment is bis(phthalocyanylalumino)tetraphenyldisiloxane.

14. The method of claim 1 wherein said inkjet ink composition contains a dispersant for said pigment.

* * * * *